United States Patent [19]

Fleck et al.

[11] Patent Number: 5,218,703
[45] Date of Patent: Jun. 8, 1993

[54] CIRCUIT CONFIGURATION AND METHOD FOR PRIORITY SELECTION OF INTERRUPTS FOR A MICROPROCESSOR

[75] Inventors: Rod Fleck, Munich, Fed. Rep. of Germany; Mark Poret, Mesa, Ariz.; Karl-Heinz Mattheis, Forstinning, Fed. Rep. of Germany

[73] Assignee: Siemens Aktiengesellschaft, Munich, Fed. Rep. of Germany

[21] Appl. No.: 870,764

[22] Filed: Apr. 20, 1992

Related U.S. Application Data

[63] Continuation of Ser. No. 376,846, Jul. 7, 1989, abandoned.

[30] Foreign Application Priority Data

Jul. 7, 1988 [DE] Fed. Rep. of Germany ....... 3823059

[51] Int. Cl.⁵ ............................................. G06F 13/26
[52] U.S. Cl. .................... 395/725; 395/275; 395/325; 364/241.2; 364/241.3; 364/240; 364/240.1; 364/DIG. 1
[58] Field of Search ............... 364/DIG. 1, DIG. 2; 395/725, 325, 275, 425, 800; 370/85.2, 85.6, 85.9; 340/825.5, 825.51, 825.06

[56] References Cited

U.S. PATENT DOCUMENTS

| | | | |
|---|---|---|---|
| 4,172,284 | 10/1979 | Heinrich et al. | 364/200 |
| 4,218,739 | 8/1980 | Negi et al. | 364/200 |
| 4,275,458 | 6/1981 | Khera | 364/900 |
| 4,349,873 | 9/1982 | Gunter et al. | 364/200 |
| 4,470,111 | 9/1984 | Jenkins et al. | 364/200 |
| 4,484,302 | 11/1984 | Cason et al. | 364/900 |
| 4,536,839 | 8/1985 | Shah et al. | 364/200 |
| 4,621,342 | 11/1986 | Capizzi et al. | 364/900 |
| 4,648,029 | 3/1987 | Cooper et al. | 364/200 |
| 4,764,869 | 8/1988 | Miyazaki et al. | 364/300 |
| 4,791,553 | 12/1988 | Campanini | 364/200 |
| 4,868,742 | 9/1989 | Gant et al. | 364/200 |
| 4,920,486 | 4/1990 | Nielson | 364/200 |

*Primary Examiner*—Michael R. Fleming
*Assistant Examiner*—Gopal C. Ray
*Attorney, Agent, or Firm*—Herbert L. Lerner; Laurence A. Greenberg

[57] ABSTRACT

A circuit configuration and a method for priority selection of interrupts for a microprocessor in an integrated circuit which includes a central processing unit, a central interrupt node connected to the central processing unit, N interrupt sources for presenting interrupt requests to the central processing unit, peripheral interrupt nodes each being connected to a respective one of the N interrupt sources. A common interrupt bus is connected to the peripheral interrupt nodes and to the central interrupt node. The method for priority selection includes activating the interrupt bus in a prioritizing round in accordance with a priority value with a peripheral interrupt node assigned to an interrupt source in the presence of an interrupt request of the interrupt source.

11 Claims, 4 Drawing Sheets

FIG 2

CIRCUIT CONFIGURATION AND METHOD FOR PRIORITY SELECTION OF INTERRUPTS FOR A MICROPROCESSOR

This application is a continuation of application Ser. No. 376,846, filed Jul. 7, 1989, now abandoned.

The invention relates to a circuit configuration and method for priority selection in an integrated circuit having a central processing unit and a plurality of interrupt sources that present interrupt requests of differing priority to the central processing unit.

BACKGROUND AND PRIOR ART

In the very first computer systems, no interruption of the program running at a given time was possible. In order to enable external units to intervene with the central processing unit, the central processing unit had to poll all of the systems at particular time intervals as to whether or not a service request to the processing unit was present. During these polling periods, the central processing unit could perform no other tasks.

The next computer generation was constructed in such a way that the central processing unit could be interrupted through an interrupt line whenever a service request from a peripheral source was present. In response, the central processing unit had to poll all of the sources, in order to find the source making the interrupt request.

Later computer systems had a plurality of interrupt request lines, or had central interrupt components. These so-called central interrupt controllers generated a vector by means of which the interrupting source could be identified. Some systems already had interrupt masks, which made it possible to prefer sources of higher priority over those of lower priority.

Modern microcontrollers are now equipped with a greater number of function units jointly integrated on the chip, such as counter/timers, analog/digital converters, serial interfaces, and capture and compare units. All of these units execute certain functions assigned to them parallel to the central processing unit, until some service by the CPU is required. Upon such interruptions, the central processing unit stores the status of the program that has just run and branches to a subroutine, in order to service the applicable source.

In modern microcontroller systems, the number of events or tasks that are to be performed quasi in parallel has risen drastically in the meantime. The necessity for simultaneous processing of more and more interrupt requests leads to extremely complex, expensive systems for processing interrupt requests in microcontrollers. Another factor is that one and the same microcontroller component must be constructed for a great number of different applications. Each application requires a special spectrum of tasks to be performed quasi in parallel. These needs for flexibility mean, for instance, that the sequence in which interrupt requests that are simultaneously present are processed must be variable; that is, it must be possible to prioritize the interrupt requests.

Many microcontroller manufacturers presently offer so-called microcontroller families, in which although the central processing unit is identical, the number and type of jointly integrated peripheral units are variable from one component to another. A circuit configuration for priority selection is now expected to meet all of the characteristics of the individual components within the family in the most homogeneous manner possible.

Most systems now include central decision components, which process interrupt requests with one or more request and feedback lines.

If interrupt sources are few in number, then in general a single-wire system is preferred, in which the interrupt source activates a request line, whereupon the central processing unit interrupts the program running at that time and searches for the source of the interruption. In this search operation, the priority of each individual source can also be simultaneously determined, and the source having the highest priority can be selected. If more than one source has the same priority, then the search operation can determine which source is preferred. Generally, the central processing unit will accept only requests having higher priority than the priority of the task that is being performed.

A technique less often used provides a separate interrupt line connected to the central processing unit, for each interrupt source. Each line can be separately released or blocked, prioritized and evaluated. In order to reduce the hardware expense required, an attempt is made to group the interrupt requests into groups of equal priority. The advantage of this prioritizing method is that the parallel selection method makes nigh response speeds attainable. However, with a plurality of interrupt sources, the flexibility is greatly restricted.

In addition to the circuits having a central interrupt unit, other interrupt systems, known as distributed interrupt systems, are known, in which each interrupt source has its own hardware circuit, with which it is possible to compare its own priority with that of the other sources. When the source having the highest priority at that instant is found, the central processing unit can be made to interrupt the program being run, through a feedback line.

The advantage of this variant circuit is that an arbitrarily great number of additional interrupt sources can be implemented, without impairing the complete flexibility of the system. A condition for this decentralized interrupt system is that the circuit expenditure in and between the interrupt sources be kept as low as possible. In a known system of this type, all of the sources are connected to one another by a common line. Through a special polling and feedback scheme, each source tests whether or not it has the highest priority by using priority bits that are present over the common line.

The polling process begins in each case with the highest priority bit and jumps in stages to the lower-value priority bit. Each source that has a lower priority with respect to another source must release the common line. At the end of the polling mode, only the source having the highest priority at that instant remains connected with the common line. Although this polling circuit is distinguished by a simple structure of the connecting line, its use in microcontroller systems that have to perform real-time tasks is unsatisfactory, because the system-dictated serial polling mode necessitates an overly long response time.

It is accordingly an object of the invention to provide a circuit configuration and method for priority selection, which overcome the hereinafore-mentioned disadvantages of the heretofore-known methods and devices of this general type and which are distinguished by a simple construction and a short response time.

With the foregoing and other objects in view there is provided, in accordance with the invention, a circuit configuration for priority selection in an integrated circuit, comprising a central processing unit, a central interrupt node connected to the central processing unit, N interrupt sources for presenting interrupt requests to the central processing unit, peripheral interrupt nodes each being connected to a respective one of the N interrupt sources, and a common interrupt bus connected to the peripheral interrupt nodes and to the central interrupt node.

SUMMARY OF THE INVENTION

In accordance with another feature of the invention, the interrupt bus includes m signal lines, where m is greater than 1 and no greater than the square root of N, so that m meets the relationship $1 < m \leq \sqrt{N}$.

In accordance with a further feature of the invention, the interrupt bus has a central activation logic for activating one of the signal lines with the highest activated value and all of the signal lines having a value lower than that of the one signal line.

In accordance with an added feature of the invention, the peripheral interrupt nodes include means for activating the interrupt bus in accordance with a priority value.

In accordance with an additional feature of the invention, the central activation logic has a respective level recognition circuit for each of the m signal lines, for releasing the signal line connected thereto and all of the signal lines with a lower value, in case of a change in level.

In accordance with yet another feature of the invention, the central interrupt node has a priority latch for temporary storage of recognized priority values in memory, and a comparator connected to the priority latch for comparing an ascertained priority number with the priority of a program being run in the central processing unit.

In accordance with yet a further feature of the invention, each of the interrupt nodes includes means for directly releasing the m signal lines or through encoded sets of discharge wires representing a user pre-programmed priority and all lower priorities.

With the objects of the invention in view, there is also provided a method for priority selection which comprises activating the interrupt bus in accordance with a priority value with a peripheral interrupt node assigned to an interrupt source in the presence of an interrupt request of the interrupt source.

In accordance with another mode of the invention, there is provided a method which comprises during a first selection cycle, activating a signal line with each interrupt source making an interrupt request through the peripheral interrupt node connected thereto in accordance with the applicable priority value, subsequently activating the highest-value activated signal line and all of the signal lines having a lower value than the highest-value activated signal line with the central activation logic, storing the priority value of the highest-value activated signal line in memory with the central interrupt node, and simultaneously preventing all of the peripheral interrupt nodes participating in the selection cycle that have activated a signal line of lower value than the highest-value activated signal line from participating in the next selection cycle; and in the next selection cycle, again activating a signal line with all of the still-remaining peripheral interrupt nodes in accordance with the priority value thereof, subsequently again activating the highest-value activated signal line and all of the signal lines of lower value than the highest-value activated signal line with the central activation logic, storing the priority value of the highest-value activated signal line in memory with the central interrupt node and simultaneously excluding all of the peripheral interrupt nodes that have activated a signal line of lower value than the highest-value activated signal line from the next selection cycle.

In accordance with a further mode of the invention, there is provided a method which comprises immediately beginning a prioritizing round if no peripheral has made a request or if the current CPU priority is greater than or equal to the interrupting priority.

In accordance with an added mode of the invention, there is provided a method which comprises placing all of the signal lines in a single circuit.

In accordance with an additional mode of the invention, there is provided a method which comprises generating a vector to the central processing unit with the interrupt source having the highest priority number, once the interrupt source having the highest priority number has been found.

In accordance with a concomitant node of the invention, there is provided a method which comprises transmitting an acknowledgement signal through the interrupt bus with the central interrupt node whenever an interrupt request is accepted by the central processing unit, and erasing the interrupt request with the peripheral interrupt source and the peripheral interrupt node connected thereto that had the highest priority in the preceding selection cycle.

The object of the invention is also attained in accordance with the invention, due to the fact that the signal lines of the interrupt bus are activated by the interrupt sources, which present an interrupt request to the central processing unit, in accordance with the priority numbers assigned to them. To this end, in a first selection cycle, the signal line corresponding to the higher-value portion of the priority number (priority value) and all of the lower-value signal lines are activated. The central interrupt node stores the priority value of the highest-value activated signal line in memory. All of the peripheral interrupt nodes involved in the selection cycle then compare the status on the interrupt bus with the priority value they have transmitted. If an interrupt node ascertains that its priority value was not the highest at that time, then the associated interrupt source is precluded from participating in the next selection cycle. In a further selection cycle, all of the remaining sources again participate in the priority selection, by once again activating the signal lines of the interrupt bus in accordance with the next-lower-value portion of the priority number. The central interrupt node again stores the priority value corresponding to the highest-value activated signal line in memory, and the peripheral interrupt nodes preclude all of the sources having a priority value which was not the highest from participating in the next selection cycle.

This process is continued until such time as the interrupt source having the highest priority number has been found. The interrupt node that has won the prioritizing round then, in one or more cycles, transmits an identification address or vector to the central interrupt node through the interrupt bus. On the basis of the ascertained priority of the program that is being run in the central processing unit, as well as on the basis of other conditions (for instance, all interrupts blocked, end-of-command, etc.) in the central processing unit, this central interrupt node decides whether or not the interrupt request can be processed. If the answer is yes, the central interrupt node sends an acknowledgement signal through the interrupt bus, which causes the peripheral interrupt node that has won the prioritizing round to erase its interrupt request. At the same time, the central processing unit is made to interrupt the program running at that time and to branch to the interrupt processing routine determined by the vector. However, if the applicable interrupt request is not accepted by the central interrupt node, such as because the program then running in the central processing unit has a higher priority than the interrupt request, then the request continues to be set in the applicable peripheral interrupt node, and the node again takes part in the next prioritizing round. The next prioritizing round can immediately begin if no peripheral has made a request or if the current CPU priority is greater than or equal to the interrupting priority. This reduces the overall interrupt latency since no dummy interrupt vector need be sent to the central node.

The number of possible priority numbers is defined by the number of selection cycles and the number of signal lines in the interrupt bus. In the case of N interrupt sources, the equation is $N \leq (m+1)^n$, where m stands for the number of signal lines and n stands for the number of selection cycles. In the case of a microcontroller with 256 interrupt sources, this means, for instance, that with a configuration having four signal lines, the interrupt source with the highest priority number will have been found after no more than four selection cycles.

With the method according to the invention it is possible to set each interrupt source to any arbitrary priority, by simply changing its register contents. When additional interrupt sources are implemented, the expense for the circuit configuration for priority selection merely rises linearly with the number of new sources.

A further advantage is that in the implementation of further interrupt sources, neither the interrupt bus nor the central interrupt node needs to be modified. Furthermore, the circuit of the peripheral interrupt nodes need not be modified; it can simply be duplicated. The additional cost factor for the implementation of each further interrupt source is accordingly low.

Since all of the interrupt sources making an interrupt request are polled simultaneously, or in other words in parallel as to their priority, in the method according to the invention, the method is substantially faster than with a purely serial polling method. Moreover, the number of selection cycles can be reduced by providing a suitably number of signal lines in the interrupt bus. The circuit designer thus has the option of either reducing the number of signal lines, by allowing more selection cycles for polling, or minimizing the time expenditure for the priority selection by increasing the number of signal lines in the interrupt bus.

Other features which are considered as characteristic for the invention are set forth in the appended claims.

Although the invention is illustrated and described herein as embodied in a circuit configuration and method for priority selection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
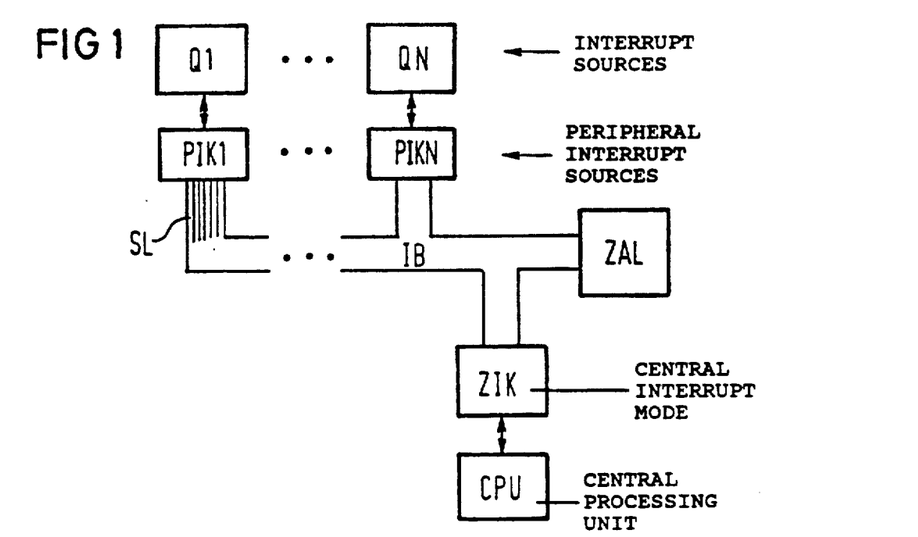
FIG. 1 is a block circuit diagram of the entire circuit configuration.

Referring now to the figures of the drawing in detail and first, particularly, to FIG. 1 thereof, there are seen N interrupt sources Q1-QN each being connected through a respective associated peripheral interrupt node PIK1-PIKN to a common interrupt bus IB, which has m signal lines SL. The interrupt bus IB also communicates with a central activation logic ZAL and a central interrupt node ZIK, which in turn has access to a central processing unit CPU. The central activation logic ZAL is not required if each of the interrupt nodes can directly discharge the m signal lines or if an encoded scheme is used with sets of discharge wires representing a user pre-programmed priority and all lower priorities.

It is also possible to construct the central interrupt prioritization network in such a way that the m signal lines SL are internally used in a single circuit This provides a central interrupt system which grows linearly in comparison to conventional systems which grow exponentially and it also allows user programming of interrupt levels.

During a first selection cycle, each peripheral interrupt node PIK having an associated interrupt source Q which presents an interrupt request to the central processing unit CPU, activates the signal line SL corresponding to its priority value. The central activation logic ZAL thereupon activates the highest-value activated signal line, as well as all of the signal lines having a lower value than that. All of the peripheral interrupt nodes PIK that have not activated the highest-value activated signal line are thereupon precluded from the next selection cycles. The central interrupt node ZIK stores the priority value of the highest-value activated signal line SL in memory and combines this priority value with the priority values that were obtained during preceding selection cycles to make a priority number, and compares this number with the priority of the program running at that time in the central processing unit CPU. If the priority number ascertained in this way is accepted by the central processing unit CPU, the peripheral interrupt node PIK having the highest priority number just ascertained can transfer the address of its source to the central processing unit CPU, through the interrupt bus IB.

Figure 2:
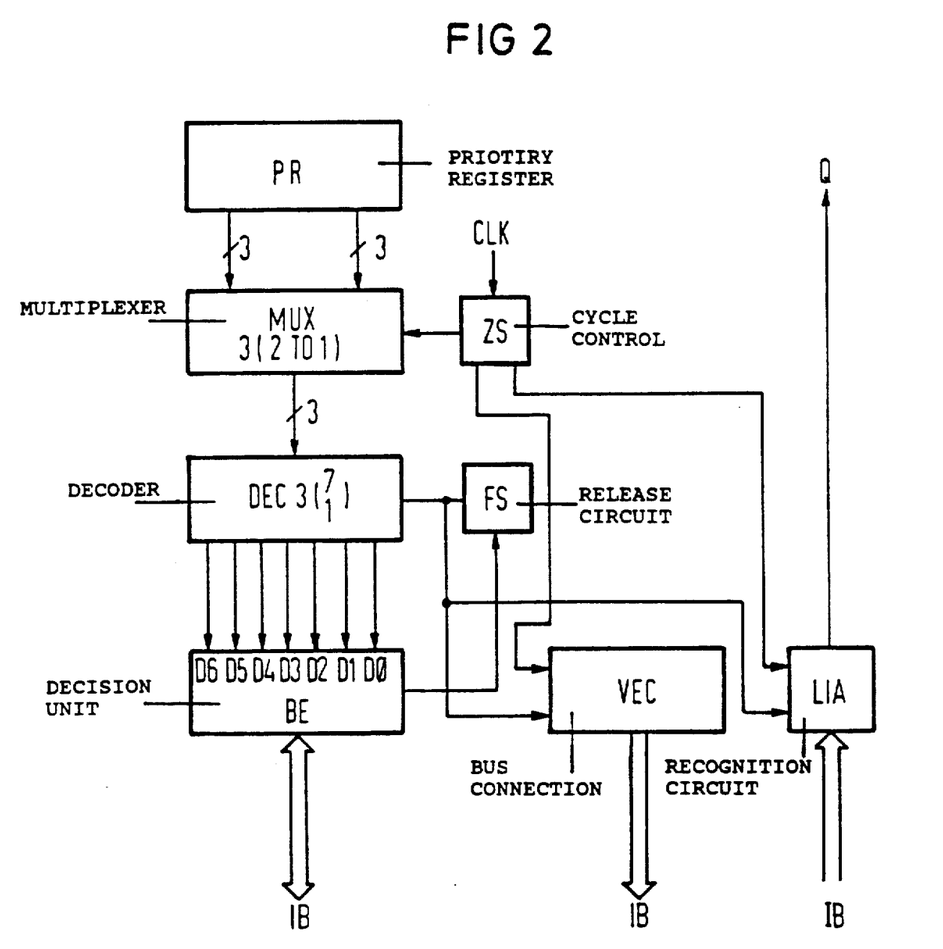
FIG. 2 is a block circuit diagram of the structure of a peripheral interrupt node.

The peripheral interrupt node PIK shown in FIG. 2 has a priority register PR, into which the absolute priority number, which may be composed of a level number and a group number, and is associated with the interrupt source Q, can be written. A selected portion of the priority number (=priority value) can be transferred from the priority register PR to a bus connection decision unit BE through a multiplexor MUX and a decoder DEC, and from there to the interrupt bus IB. The multiplexer MUX is informed through a cycle control circuit ZS as to which portion of the priority number should be transferred from the priority register PR to the decoder. A release circuit FS, which communicates with the bus connection decision unit BE, releases the output of the decoder DEC whenever the bus connection decision unit BE in the preceding selection cycle had activated the highest-value activated signal line SL. Otherwise, the decoder DEC cannot activate any signal line in the selection cycle just completed, unless it is the first selection cycle being performed, in which all of the peripheral interrupt nodes PIK having interrupt sources Q which have made an interrupt request, can still participate.

The peripheral interrupt node PIK, which is controlled through the cycle control circuit ZS and the release circuit FS, can transmit the vector address assigned to it either by hard wiring or through a register, through a bus connection unit VEC, to the interrupt bus IB.

The peripheral interrupt node PIK recognizes the acknowledgement signal from the central interrupt node ZIK through a recognition circuit LIA (erase interrupt request), which is likewise activated through the cycle control circuit ZS and the release circuit FS, and as a result informs the associated interrupt source that the interrupt request has been accepted, and that the request should accordingly be erased.

In the exemplary embodiment, a three-bit (2 to 1) multiplexer is shown, which reads three bits at a time from a six-bit priority register PR during two selection cycles, and through a 1 of 7 decoder DEC activates one of seven signal lines SL.

Figure 3:
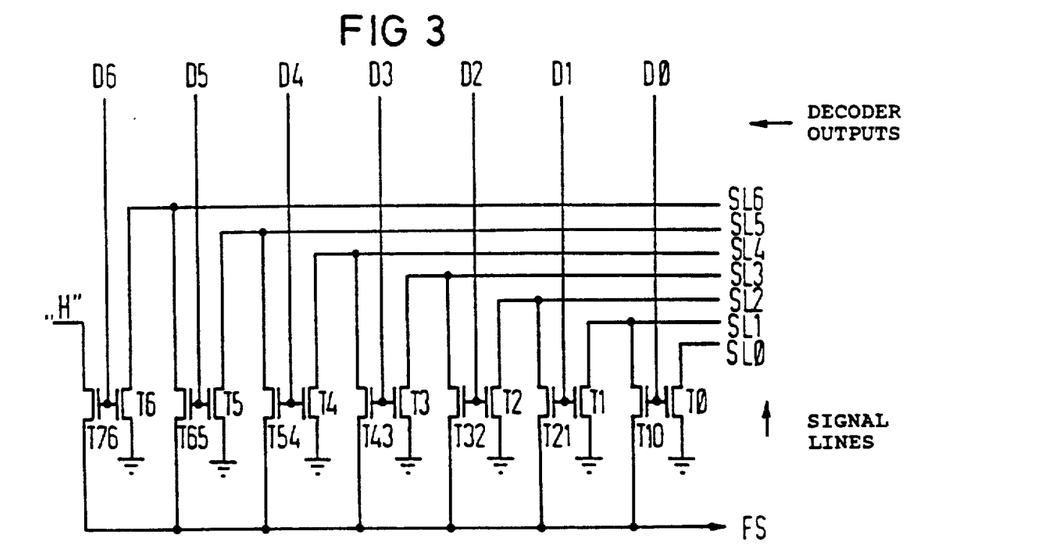
FIG. 3 is a schematic circuit diagram of an embodiment of a switching device for a bus connection decision unit inside a peripheral interrupt node.

The switching example for a bus connection decision unit BE shown in FIG. 3 has seven decoder outputs D0–D6, seven signal lines SL0–SL6, and one output line over which the release circuit FS is informed as to whether or not the peripheral interrupt node (PIK) can again participate in the next selection cycle. The interrupt bus IB in this case is formed of seven lines SL0–SL6. At the beginning of each cycle, the bus is preset to the HIGH state. An activation of one signal line then means an resetting of the line to the LOW state. Each decoder output D0–D6 controls a transistor T0–T6 and a further transistor T10–T76 in such a way that when the corresponding decoder output D becomes active, the associated signal line SL is reset and the next-higher-value signal line SL is connected to the release circuit FS. If this next-higher signal line SL is reset, that means that this peripheral interrupt node PIK no longer participates during the next selection cycle, because the priority number of its interrupt source Q is lower than the priority number of some other interrupt source Q.

In order to allow each peripheral interrupt node PIK to decide for itself whether or not it has the highest priority value, all of the signal lines of lower value with respect to the highest activated signal line on the bus must be activated. This can be accomplished either by a suitable selection of the decoder DEC, or by means of the central activation logic, as in the exemplary embodiment.

Figure 4:
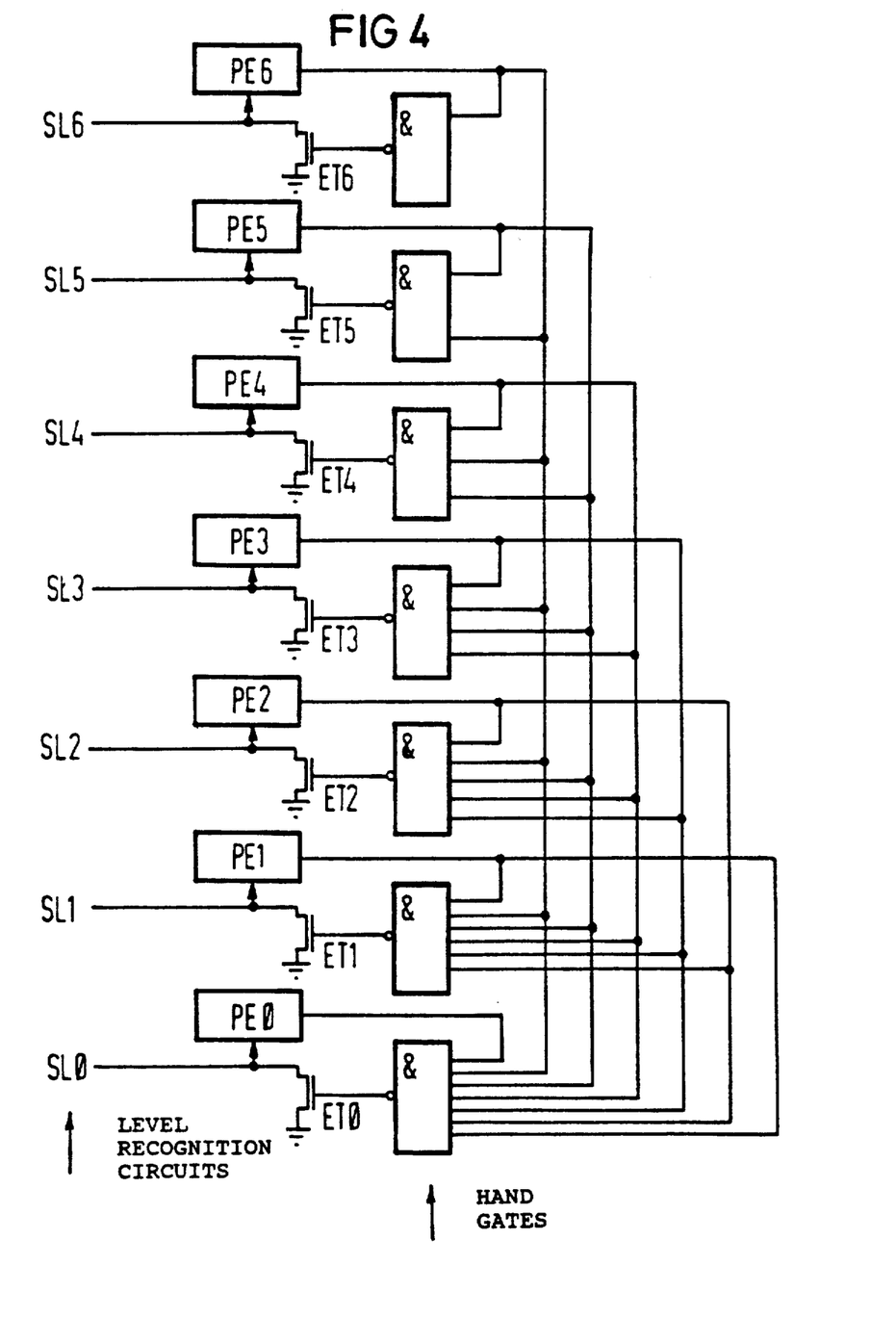
FIG. 4 is a schematic and block circuit diagram of the structure of a central activation logic.

In FIG. 4, the central activation logic ZAL is formed of seven level recognition circuits PE0–PE6, which activate their associate and accordingly lower-value signal lines through NAND gates and resetting transistors ET0–ET6.

The activation of the signal line that is assigned to the particular level recognition circuit itself is performed in order to optimize the level transition speed. Whenever one of the level recognition circuits PE recognizes a change in level of the signal line SL associated with it during one selection cycle, this line and all of the lower-value signal lines SL are connected to ground through the NAND gates and the resetting transistors ET. With the aid of this configuration, it is assured that the bus connection decision units will function correctly even if two interrupt sources Q activate two non-adjacent signal lines SL of the interrupt bus IB.

The interrupt source Q having the highest priority number recognizes through its bus connection decision unit BE that it has won, and thereupon in turn transmits a vector through the interrupt bus IB to the central processing unit CPU.

The central interrupt node ZIK has the task of comparing the priority number of the winning interrupt source Q after n selection cycles with the priority of the central processing unit CPU, and of transmitting the received vector to the central processing unit if the new priority is higher, in such a way that the CPU will branch to the appropriate handling routine. An acknowledgement signal for erasing the interrupt request of the interrupt node PIK that had won the prioritizing round is transmitted from an acknowledgement signal driver QSTR shown in FIG. 5, through the interrupt bus IB.

Figure 5:
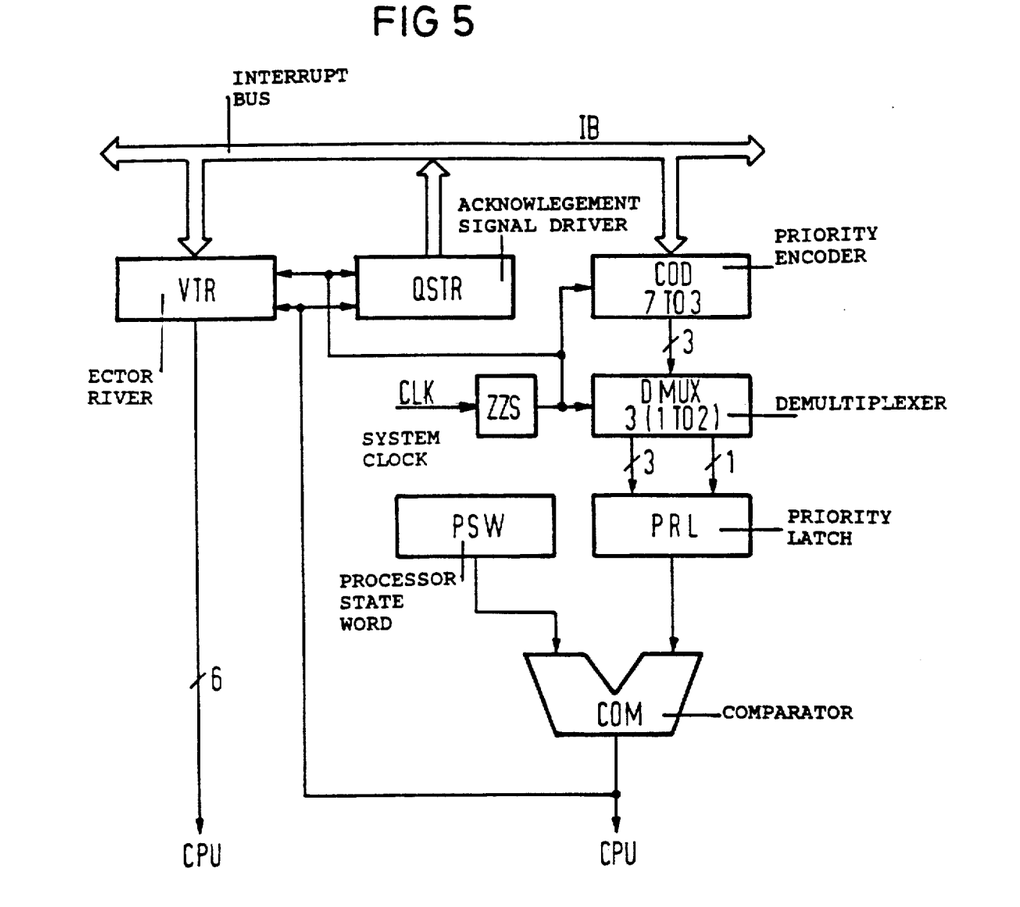
FIG. 5 is a block circuit diagram of the structure of a central interrupt node.

According to FIG. 5, the central interrupt node ZIK is, for instance, formed of a priority encoder COD, which is connected to the interrupt bus IB and sends the number of the signal line SL, encoded, on to a demultiplexer DMUX and a priority latch PRL. In the priority latch PRL, the priority values of the individual selection cycles are combined sequentially to make the complete priority number. The demultiplexer DMUX and the priority latch PRL are controlled by a cycle control circuit ZZS, which is activated by the system clock CLK, like the release circuit FS of the peripheral interrupt node PIK. Finally, a comparator COM compares the priority number stored in memory in the priority latch PRL with the priority number from a processor status word PSW of the program that is being run in the central processing unit CPU.

If it is found in this comparison that the priority number ascertained through the interrupt bus is higher than the number stored in the PSW, then the vector address transmitted from the peripheral interrupt node PIK is passed onto the CPU, which thereupon interrupts the program then running and branches to the appropriate interrupt handling routine.

In the next cycle, the central interrupt node ZIK sends an acknowledgement signal through the interrupt bus IB, which causes the interrupt node PIK that has won the prioritizing round to erase the interrupt request at the source connected to it.

In the exemplary embodiment described and shown herein, the priority encoder COD is, for instance, in the form of a 7 to 3 encoder, and the demultiplexer DMUX is in the form of a three-bit (1 to 2) circuit. Although the priority registers of the individual peripheral interrupt nodes PIK have a length of six bits, for instance, the priority latch PRL can have a lesser bit width, such as four bits. To this end, the absolute priority number of an interrupt source is divided into a four-bit level number and a two-bit group number. The level number decides whether or not an interrupt request has a sufficiently high priority to interrupt the running program. In contrast, when a plurality of interrupt requests of the same level number are present, the group number determines which request will be serviced first. Therefore, in this example, only the ascertained four-bit priority level number is compared with the four-bit level number stored in memory in the PSW.

The central interrupt node ZIK passes the received vector, which in the exemplary embodiment is a six-bit address (each of the 64 possible peripheral interrupt nodes in this system having its own vector), through a vector driver VTR to the CPU. In the next cycle, the acknowledgement signal is transmitted over the interrupt bus IB.

However, in the system presented herein, it is also possible to furnish the CPU itself with a peripheral interrupt node. To this end, the priority number contained in the PSW must be augmented by a group number. The CPU then participates, with the priority assigned to it, in the prioritizing round like every other peripheral interrupt node PIK. The central interrupt node then only has the task of receiving the vector and passing it on to the CPU and of generating the acknowledgement signal. The CPU accepts the vector only whenever it ascertains that its priority has lost in favor of other priorities during the prioritizing round. It must inform the central interrupt node of this fact, in such a way that the central interrupt node can release the acknowledgement signal from the acknowledgement signal driver QSTR to the interrupt bus IB.

With an interrupt bus IB that has 7 signal lines SL, as in this example, up to 64 interrupt sources Q can be polled and the interrupt source Q having the highest priority number can be determined within two selection cycles, using the equation $N = (m+1)^n$.

We claim:

1. Method for priority selection wherein an integrated circuit includes a central processing unit, a central interrupt node connected to the central processing unit, storage means in said central interrupt node for storing priority levels, N interrupt sources for presenting interrupt requests to the central processing unit wherein N is a positive integer no less than 4, said interrupt sources having different priority levels, a plurality of peripheral interrupt nodes each being connected to a respective one of the N interrupt sources, and a common interrupt bus connected between the peripheral interrupt nodes and to the central interrupt node, the method for priority selection which comprises the steps of activating the interrupt bus in accordance with a priority level having a most and a least significant part with a peripheral interrupt node assigned to an interrupt source in the presence of an interrupt request of the interrupt source, wherein said interrupt bus includes m signal lines, wherein m is greater than 1 and no greater than the square root of N, transmitting in said signal lines signals which indicate an active or inactive status of said signal lines; activating said peripheral node in response to an interrupt request for activating to said active status one of said signal lines in accordance with its respective priority in one of said most and least significant parts, recognizing one of said signal lines with the highest activated priority level by means of a central activation logic connected to said interrupt bus, and activating all of said signal lines having a priority level lower than that of said one signal line.

2. Method for priority selection according to claim 1, wherein the interrupt bus is connected to a central activation logic for activating one of the signal lines with the highest activated priority level and all of the signal lines with the highest activated priority level and all of the signal lines having a priority level lower than that of the one signal line, which comprises during a first selection cycle, activating a signal line with each interrupt source making an interrupt request through the peripheral interrupt node connected thereto in accordance with the applicable priority level, subsequently activating the highest priority level activated signal line and all of the signal lines having a lower priority level than the highest-value activated signal line with the central activation logic, storing the priority level of the highest priority level activated signal line in memory with the central interrupt node, and simultaneously preventing all of the peripheral interrupt nodes participating in the selection cycle that have activated a signal line of lower priority level than the highest priority level activated signal line from participating in the next selection cycle; and in the next selection cycle, again activating a signal line with all of the still-remaining peripheral interrupt nodes in accordance with the priority level thereof, subsequently again activating the highest priority level activated signal line and all of the signal lines of lower priority level than the highest priority level activated signal line with the central activation logic, storing the priority level of the highest priority level activated signal line in memory with the central interrupt node and simultaneously excluding all of the peripheral interrupt nodes that have activated a signal line of a priority level lower than the highest priority level activated signal line from the next selection cycle.

3. Method for priority selection according to claim 2, which comprises immediately beginning a prioritizing round if no peripheral request has been made.

4. Method for priority selection according to claim 2, which comprises immediately beginning a prioritizing round if the current CPU priority is at least as great as the interrupting priority.

5. Method for priority selection according to claim 2, which comprises placing all of the signal lines in a single circuit.

6. Method for priority selection according to claim 2, which comprises generating a vector to the central processing unit with the interrupt source having the highest priority level, once the interrupt source having the highest priority level has been found.

7. Method for priority selection according to claim 2, which comprises transmitting an acknowledgement signal through the interrupt bus with the central interrupt node whenever an interrupt request is accepted by the central processing unit, and erasing the interrupt request with the peripheral interrupt source and the peripheral interrupt node connected thereto that had the highest priority level in the preceding selection cycle.

8. Circuit configuration for selection of priority in an integrated circuit, comprising a central processing unit, a central interrupt node having storage means for storing priority levels connected to said central processing unit, N interrupt sources for presenting interrupt requests to said central processing unit, wherein N is a positive integer no less than 4, said interrupt sources having different priority levels, each of said interrupt priority levels having a most significant and a least significant part, a plurality of peripheral interrupt nodes each being connected to a respective one of said N interrupt sources, and a common interrupt bus connected to said peripheral interrupt nodes and to said central interrupt node, wherein said interrupt bus includes m signal lines, wherein m is greater than 1 and no greater than the square root of N, transmitting in said signal lines signals which indicate an active or inactive status of said signal lines, peripheral interrupt node activating means in said interrupt sources being responsive to an interrupt request to activate to said active status one of said signal lines in accordance with its respective most or least significant part of respective priority, a central activation logic connected to said interrupt bus for recognizing one of said signal lines with the highest activated value and for activating all of said signal lines having a value lower than that of said one signal line, means for controlling the priority selection in said central interrupt node in a first and a second step, in the first step selecting the least significant part of the priority level being stored in said storage means and in the second step selecting the most significant part forming in combination with the stored part the selected priority.

9. Circuit configuration for priority selection according to claim 8, wherein each of said interrupt nodes includes means for directly deactivating said m signal lines.

10. Circuit configuration for priority selection according to claim 8, wherein each of said interrupt nodes includes means for directly deactivating said m signal lines through encoded sets of discharge wires representing a user pre-programmed priority and all lower priorities.

11. Circuit configuration for priority selection according to claim 8, including in said central interrupt node a comparator connected to said storing means, a program being run in said central processing unit having a program priority, said comparator coupled to said storage means and to said central processing unit for comparing the priority level of the interrupt sources with said program priority, and interrupt means in said central interrupt node for interrupting the program if the priority level of a respective interrupt source is higher than the priority level of the program being run in said central processing unit.

* * * * *